Feb. 28, 1956         W. B. EWING         2,736,376
SCREEN AND FRAME ASSEMBLY
Filed Oct. 21, 1952                 2 Sheets-Sheet 1
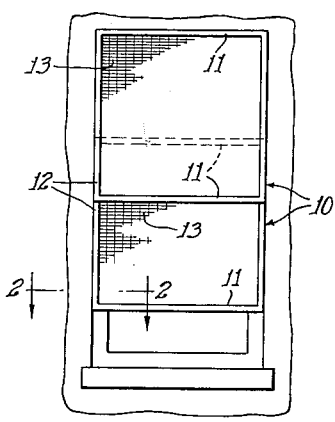
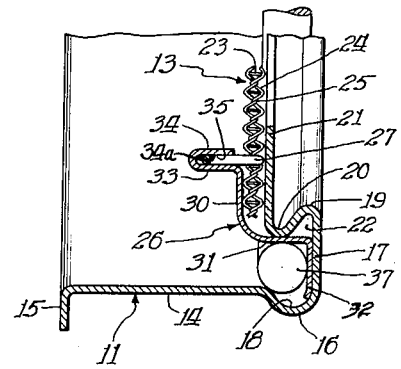
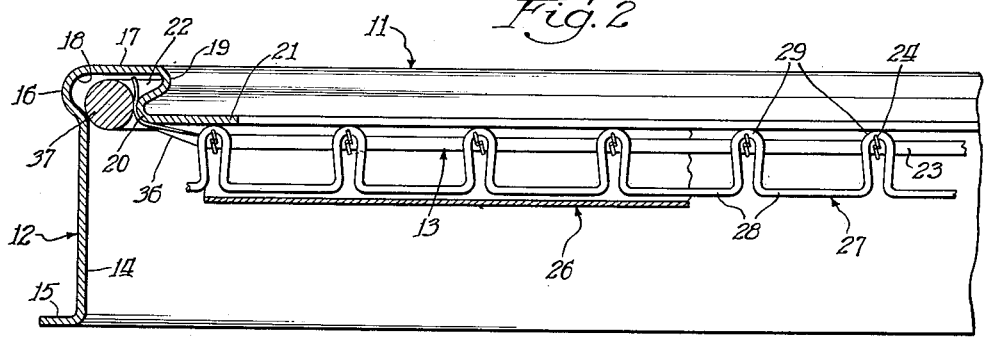
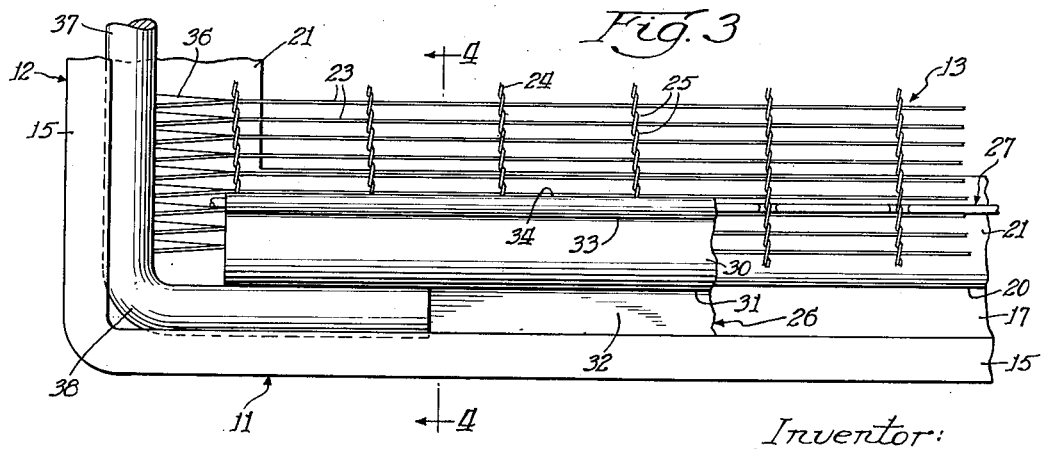
Inventor:
Walkley B. Ewing
By: Frank C. Parker
Atty Feb. 28, 1956 W. B. EWING 2,736,376
SCREEN AND FRAME ASSEMBLY
Filed Oct. 21, 1952 2 Sheets-Sheet 2
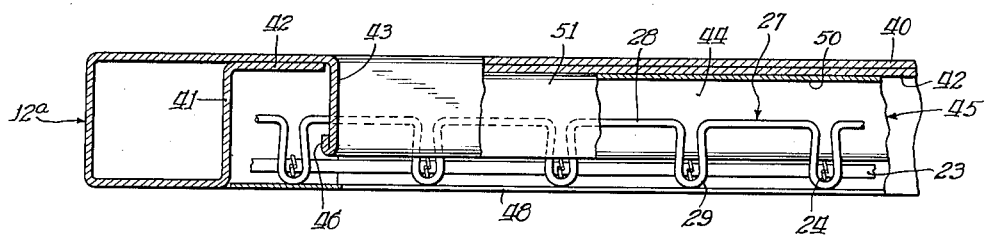
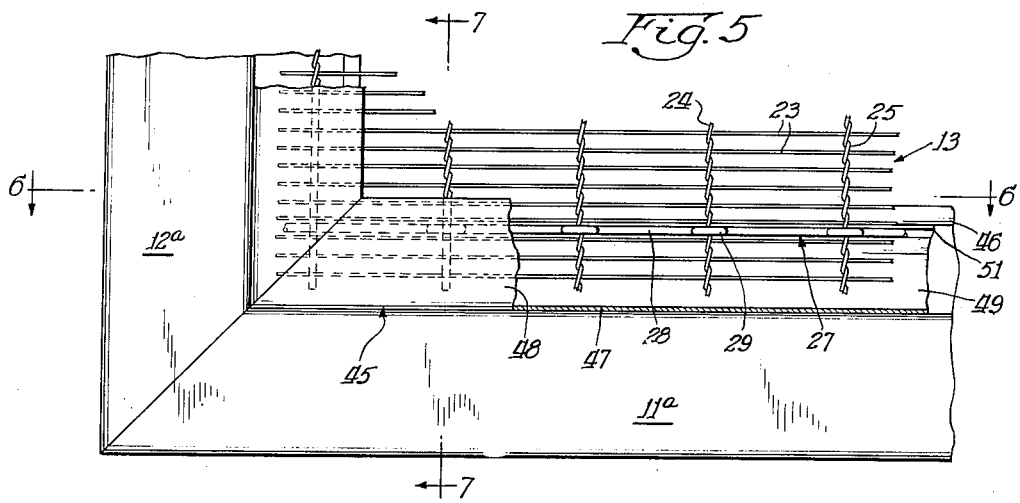
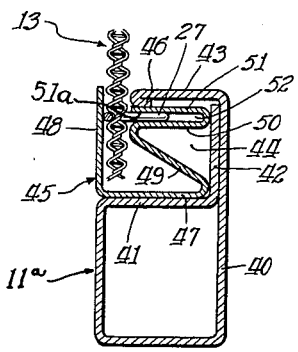
Inventor:
Walkley B. Ewing
By Frank C. Parker
Atty.

United States Patent Office 2,736,376
Patented Feb. 28, 1956

2,736,376

SCREEN AND FRAME ASSEMBLY

Walkley B. Ewing, Grand Rapids, Mich., assignor, by mesne assignments, to Borg-Warner Corporation, Chicago, Ill., a corporation of Illinois Application October 21, 1952, Serial No. 315,938

14 Claims. (Cl. 160—395)

This invention relates to screen and frame assemblies and more particularly to a novel arrangement for retaining the peripheral portion of the screen within an embracing frame.

It is an object of the present invention to provide an improved arrangement for retaining the edge portion of the screen within a recess formed within the supporting frame without substantially distorting the edge of the screen. The present invention is similar in many aspects to the disclosure of W. B. Ewing, Patent No. 2,270,423, but differs, in one respect, from said patent disclosure in that the present invention provides an arrangement for retaining a screen in assembly with a supporting frame member which is composed of a formed sheet metal strip.

It is a more specific object of the present invention to provide an improved construction utilizing a substantially unitary sheet metal frame member and an insert means for retaining in assembly with the frame member the end portion of a piece of screen of the type comprising longitudinally extending warp strands and parallel ribbon-like filler strands positioned with their major surfaces at an angle to the plane of the screen.

A still further detailed object of the invention is to provide an assembly for mounting the end portion of a screen in secure engagement with a frame member. In accomplishing this object, an insert is disposed within a longitudinally extending opening in the frame member and the insert together with a portion of the frame member comprise a pair of substantially parallel walls for receiving the end portion of the screen. A sinuous retainer of the general type disclosed in the aforementioned Ewing Patent No. 2,270,423 is utilized in conjunction with the improved insert disclosed herein for retaining the screen and frame member in assembly.

It is a still further and more detailed object of the invention to provide an arrangement affording the above enumerated advantages, together with the further advantage that the screen is maintained under a predetermined tension which is effective to cause the ribbon-like filler members to retain their relative position as well as to return to said relative position when removed therefrom by external forces.

The above and numerous other objects and advantages of the present invention will become apparent from the detailed description when read in conjunction with the accompanying drawings which form a part of this specification, and wherein:

Fig. 1 is an elevation view indicating schematically a window frame installation incorporating the present invention;

Fig. 2 is a sectional view taken substantially along the line 2—2 of Fig. 1 and showing one embodiment of the invention;

Fig. 3 is a fragmentary enlarged view showing certain details of construction of the embodiment of the invention disclosed in Fig. 2;

Fig. 4 is a sectional view taken substantially along the line 4—4 of Fig. 3 and showing further details of construction of the first embodiment of the present invention;

Fig. 5 is a fragmentary detailed view showing certain constructional details of a second embodiment of the present invention;

Fig. 6 is a sectional view of the second embodiment of the invention and is taken substantially along the line 6—6 of Fig. 5; and Fig. 7 is a sectional view showing further constructional details of the second embodiment of the invention and is taken substantially along the line 7—7 of Fig. 5.

With reference to the drawings, wherein like reference numerals have been utilized to identify identical parts in each of the several views, and referring first to the embodiment of the invention disclosed in Figs. 1-4, there is shown in said figures a window frame including relatively slidable upper and lower screen frames 10, each comprising top and bottom frame members 11 and side frame members 12 respectively for supporting therebetween, under tension, a screen 13.

The present invention is particularly concerned with the problem of retaining the top and bottom edges of the screen 13 in assembly with the top and bottom frame members 11 while maintaining the screen 13 itself under a predetermined tension. The present invention is particularly applicable to the supporting and maintaining of a definite tension in screen material of the type comprising longitudinally extending pairs of warp wires and parallel transverse ribbon-like filler or louver wires, there being provided between the wires of each pair of warp wires, integrating twists which gives to the screen a longitudinal resilience, while at the same time maintaining a definite angular relationship between the major surfaces of the ribbon-like filler or louver wires and the plane of the screen when the screen is under a predetermined tension.

Referring in specific detail to Figs. 2-4, the top and bottom frame members 11, as well as the side frame members 12, are substantially uniform in cross section and Figs. 2 and 4, which show portions of the bottom frame member illustrate clearly the configuration of all of the frame members.

The frame members 11 and 12 comprise a substantially flat portion 14 adapted to be disposed substantially at right angles to the plane of the screen 13 and a right angled flange 15 is integrally formed on one edge of the flat portion 14. The frame member 14 is bent, as at 16, and has another flange 17. The bent portion 16 provides, on the inner side of the portion 14, a relatively shallow semi-cylindrical channel 18. Proceeding in the direction of the frame opening, the flange 17 is bent at 19 and 20 and terminates in an inwardly extending flange 21. The bends 16 and 19 and the flange 17 together form a channel or opening 22 which extends around the periphery of the window frames 10 and opens toward the plane of the screen 13.

The screen 13, which is adapted to be mounted in each of the window frames 10, comprises a plurality of horizontally extending and slightly angularly disposed substantially parallel louver or filler wires 23 which are held in uniformly spaced positions with respect to each other by means of a plurality of pairs of vertically extending warp wires 24. Each pair of warp wires 24 is provided with an integrating twist 25 between each adjacent pair of louver or filler wires 23 and the integrating twists 25 serve to hold each of the louver or filler wires 23 in a substantially fixed position with respect to each other. Reference to Fig. 4 will reveal that each of the louver or filler wires 23 is disposed at a slight angle to the horizontal in order to provide the screen 13 with sunlight deflecting properties.

The means for retaining the top and bottom end portions of each of the screen sections 13 in assembly with the top and bottom frame members 11 of each window frame 10 will now be described. This means comprises, in general, a longitudinally extending insert, represented by reference numeral 26, and a sinuous lacer-like retainer element 27. The sinuous lacer-like retainer element 27 is preferably made of some desirable metallic wire formed into a sinuous shape in any desired manner, such as, by running the wire through a pair of gears to provide elongated portions 28 alternately spaced between uniformly spaced crest portions 29. It will be noted from Fig. 2 that the space between each adjacent pair of crests 29 is substantially equal to the space between each adjacent set of warp wires 24. The lacer-like retainer 27 may be assembled with an end portion of the screen 13 by pushing the retainer element 27 between an adjacent pair of louver wires 23 near the end of the screen 13 in a manner such that each pair of warp wires 24 is received within one of the crests 29. It will be noted that the depth of each of the crests 29 is of the order of two to three times the width of each louver or filler wire 23 so that when the lacer-like retainer 27 is assembled with the end portion of the screen 13, as shown in Fig. 2, the substantially straight portions 28 which join the crests 29 are disposed some distance from the plane of the screen 13.

The insert 26 comprises an elongated strip of sheet metal deformed in cross section as best shown in Fig. 4. The insert 26 is formed with two substantially right angled portions 30 and 31, with the portion 31 having a flange 32 integral therewith and making a substantially right angle thereto. The portion 30 is provided with a right angled flange 33, which together with another flange 34 form a channel 35. The flange 32 is of sufficient length to extend into the semi-cylindrical channel 18 formed by the bend 16 in the frame member 12 and accordingly a force applied to the flange 33 in an upward direction, as viewed in Fig. 4, causes the insert to pivot about the bend 20 in the frame member 11 with the flange 32 merely engaging the base of the channel 18. It is therefore obvious that the insert 26, upon being inserted in the channel 22 formed in the frame member 12 in the manner shown in Fig. 4, tends to remain disposed therein.

When the lacer-like retainer element 27 is disposed between a pair of adjacent louver wires 23 the portions 28 of the element 27 as well as the legs of the crests 29 are received within the channel 35 in the insert 26. The flange 21 on the frame member 12 and the portion 30 on the insert 26 each comprise a pair of facing substantially parallel walls for receiving the end portion of the screen 13 and when the screen 13 is disposed between the portion 30 and the flange 21, as shown in Fig. 4, with the lacer-like retainer element 27 received within the channel 35 in the insert 26, the screen 13 is securely held in place with respect to the frame member 12. The inside surface of the flange 34 provides a shoulder 34a adapted to have the element 27 abut thereagainst when the screen is assembled with the frame member.

As is obvious, the insert 26 and lacer-like retainer element 27 are used to hold both top and bottom end portions of the screens 13 in assembly with the top and bottom frame members 11. The sides of each screen section 13 are secured to the side frame members 12 of each of the window frames 10 in the following manner. The end 36 of each louver or filler wire 23 is inserted into the channel 22 in the side frame members and is bent over the bend 20 in the side frame members. A rod 37 is inserted into the channel 22 in order to hold the end 36 of each louver wire 23 therein. The ends of the rod 37 are each bent, as at 38, and pressed into the channel 22 between the portion 31 of the insert 26 and the opposite side of the channel 22. It will be borne in mind that the rod 37 may be pressed into the channel 22 in the top and bottom frame members 11 sufficiently deep in order to abut against the flange 32 in the insert 26, however, it is not necessary, in order to hold the insert 26 in the respective top and bottom frame member channels 22 to have the rods 37 so disposed.

Turning now to the embodiment of the invention disclosed in Figs. 5, 6 and 7, the same sinuous lacer-like retainer element 27, having crests 29 for receiving each pair of warp wires 24 is utilized, but the insert and frame member are different from the insert and frame member disclosed in the first embodiment of the invention.

The frame member 11a is made of sheet metal and is deformed in cross section so that it assumes the shape clearly disclosed in Fig. 7. It will be noted that the frame members 11a and 12a are formed of a main tubular portion 40 and are provided with flanges 41, 42 and 43 which provide a channel 44 adapted to receive an insert 45. It will be noted that the edge of the flange 43 is turned over in order to provide a lip 46.

The insert 45 comprises a pair of right angled portions 47 and 48, the portion 47 being adapted to abut the flange 41 of the frame member 11a and the portion 48 providing a wall which faces the channel 44 and which lies in a plane substantially parallel to the screen 13. The insert 45 also includes portions 49, 50 and 51 respectively formed by bending the insert as clearly shown in Fig. 7. The flanges 50 and 51 together form a channel 52 adapted to receive the lacer-like retainer 27, the inner surface of the flange 51 serving as a shoulder 51a adapted to have the retainer 27 disposed in abutment therewith when the screen and frame member are assembled. It will be noted that the bent portion of the insert 45 formed between the flanges 49 and 50, together with the inwardly facing end of the flange 51 and the end of the flange 43 on the frame member 11a together form a wall which is substantially parallel to the wall defined by the portion 48 of the insert. These two walls, as shown in Fig. 7, face each other and are disposed a sufficient distance apart in order to receive the end portion of the screen 13 therebetween.

There is a certain slight amount of resilience between the flange 51 and the portion 47 of the insert 45 and when the end portion of the screen is inserted between the walls defined by the insert and frame member with the lacer-like retainer element 27 disposed within the channel 52, there is a sufficient bias to hold the insert 45 securely within the channel 44. As viewed in Fig. 7, the tension of the screen 13 is in an upward direction and any excessive pull exerted by the screen 13 tends to cause the insert to pivot about the lip 46. Due to the cross-sectional length of the portion 49, the insert 45 merely becomes wedged more securely within the channel 44 between the lip 46 and the portion 41 on the frame member 11a. Thus it is clearly apparent that the insert 45 tends to remain securely seated within the channel 44 in the frame member 11a so as to hold the screen 13 and frame member 11a in assembly with each other.

Due to the unique arrangement disclosed by the present invention for holding the screen 13 in assembly with the window frame members, it is clear that there is no tendency for there to be any distortion of any of the louver or filler wires 23 out of their normal plane. Further, in each embodiment of the invention, the insert and the frame member together include means defining a pair of substantially parallel walls between which the screen 13 is received. As will be noted, these walls provide adequate space to accommodate the thickness of the screen 13 so as to prevent distortion thereof. Further, the channel formed in the insert disclosed in each embodiment of the invention is particularly effective for retaining the lacer-like retainer element 27 therein so as to at all times maintain the screen and frame members in assembly with each other. It should be noted that the inserts disclosed in the different embodiments of the present invention make it possible to mount screen of the type disclosed herein in window frames of substantial conventional construction without resorting to expensive mounting means or methods. It is contemplated that numerous changes and modifications may be made in the present invention without departing from the spirit or scope thereof.

What is claimed is:

1. The combination with the end portion of a piece of screen composed in part of an adjacent pair of parallel ribbon-like wires, of a frame member including means defining an elongated generally U-shaped opening, an elongated insert adapted to be partially received within said U-shaped opening and including means cooperable with said frame member for retaining said insert in said opening, portions of said insert and said frame member together defining an elongated recess for receiving said end portion of the screen, and a lacer-like retainer for preventing the withdrawal of said end portion from said recess, said lacer-like retainer being in the form of a sinuous wire having crest portions which extend beyond a side of the screen and engage said insert while the portions of said wire joining said crest portions are received between said adjacent pair of said ribbon-like wires for retaining the same within said recess.

2. The combination with the end portion of a piece of screen composed in part of an adjacent pair of parallel ribbon-like wires, of a frame member including means defining an elongated generally U-shaped opening, an elongated insert adapted to be partially received within said U-shaped opening and including means cooperable with said frame member for retaining said insert in said opening, portions of said insert and said frame member together defining an elongated recess for receiving said end portion of the screen, said insert including means defining an elongated shoulder extending longitudinally along said insert, and a lacer-like retainer for preventing the withdrawal of said end portion from said recess, said lacer-like retainer being in the form of a sinuous wire having crest portions which extend beyond a side of the screen and engage said shoulder while the portions of said wire joining said crest portions are received between said adjacent pair of said ribbon-like wires for retaining the same within said recess.

3. The combination with the end portion of a piece of screen composed in part of an adjacent pair of parallel ribbon-like wires, of a frame member including means defining an elongated generally U-shaped opening, an elongated insert adapted to be partially received within said U-shaped opening and including means cooperable with said frame member for retaining said insert in said opening, portions of said insert and said frame member together defining an elongated recess for receiving said end portion of the screen, said insert including means defining an elongated channel extending longitudinally along said insert, and a lacer-like retainer for preventing the withdrawal of said end portion from said recess, said lacer-like retainer being in the form of a sinuous wire having crest portions which extend beyond a side of the screen and are received within said channel while the portions of said wire joining said crest portions are received between said adjacent pair of said ribbon-like wires for retaining the same within said recess.

4. The combination with the end portion of a piece of screen composed in part of an adjacent pair of parallel ribbon-like wires, of a frame member including means defining an elongated generally U-shaped opening, an elongated insert adapted to be partially received within said U-shaped opening and including means cooperable with said frame member for retaining said insert in said opening, portions of said insert and said frame member together defining an elongated recess for receiving said end portion of the screen, said insert including means defining an elongated generally U-shaped channel extending longitudinally along said insert and opening toward the plane of said screen, and a lacer-like retainer for preventing the withdrawal of said end portion from said recess, said lacer-like retainer being in the form of a sinuous wire having crest portions which extend beyond a side of the screen and are received within said channel while the portions of said wire joining said crest portions are received between said adjacent pair of said ribbon-like wires for retaining the same within said recess.

5. The combination with the end portion of a piece of screen composed in part of an adjacent pair of parallel ribbon-like wires, of a frame member including means defining an elongated recess opening toward the plane of said screen, an elongated insert means including means engageable with said recess defining means for retaining said insert partially within said recess, said frame member and said insert including means defining a pair of spaced and generally parallel walls for receiving said end portion of the screen therebetween, said insert including means defining a channel opening substantially in the plane of one of said walls and the channel generally facing the plane of the other of said walls, and an elongated retainer for preventing the withdrawal of said end portion from between said pair of walls, said retainer being disposed between said adjacent pair of said ribbon-like wires and including portions received in said channel for retaining said end portion of said screen disposed between said walls.

6. The combination with the end portion of a piece of screen composed in part of an adjacent pair of parallel ribbon-like wires, of a frame member including means defining an elongated recess opening toward the plane of said screen, an elongated insert means including means engageable with said recess defining means for retaining said insert partially within said recess, said frame member and a portion of said insert which is disposed outside of said recess including means defining a pair of spaced and generally parallel walls for receiving said end portion of the screen therebetween, said insert including means defining a channel opening substantially in the plane of one of said walls and the channel generally facing the plane of the other of said walls, and an elongated retainer for preventing the withdrawal of said end portion from between said pair of walls, said retainer being disposed between said adjacent pair of said ribbon-like wires and including portions received in said channel for retaining said end portion of said screen disposed between said walls.

7. The combination with the end portion of a piece of screen composed in part of an adjacent pair of parallel ribbon-like wires, of a frame member including means defining an elongated recess opening toward the plane of said screen, an elongated insert means including means engageable with said recess defining means for retaining said insert partially within said recess, said frame member and said insert including means defining a pair of spaced and generally parallel walls for receiving said end portion of the screen therebetween, a portion of said insert which is disposed outside of said recess comprising means defining a channel opening substantially in the plane of one of said walls and the channel generally facing the plane of the other of said walls, and an elongated retainer for preventing the withdrawal of said end portion from between said pair of walls, said retainer being disposed between said adjacent pair of said ribbon-like wires and including portions received in said channel for retaining said end portions of said screen disposed between said walls.

8. The combination with the end portion of a piece of screen composed in part of an adjacent pair of parallel ribbon-like wires, of a frame member including means defining an elongated recess opening toward the plane of said screen, an elongated insert means including means engageable with said recess defining means for retaining said insert partially within said recess, said frame member and said insert including means defining a pair of spaced and generally parallel walls for receiving said end portion of the screen therebetween, a portion of said insert which is disposed within said recess comprising means defining a channel opening substantially in the plane of one of said walls and the channel generally facing the plane of the other of said walls, and an elongated retainer for preventing the withdrawal of said end portion from between said pair of walls, said retainer being disposed between said adjacent pair of said ribbon-like wires and including portions received in said channel for retaining said end portion of said screen disposed between said walls.

9. The combination with the end portion of a piece of screen composed in part of an adjacent pair of parallel ribbon-like wires, of a frame member including means defining an elongated recess opening toward the plane of said screen, an elongated insert means including means engageable with said recess defining means for retaining said insert partially within said recess, said frame member and said insert including means forming a pair of generally parallel walls for receiving said end portion of the screen therebetween, at least one of said walls being defined by a portion of said insert, said insert including means defining a channel opening substantially in the plane of one of said walls and the channel generally facing the plane of the other of said walls, and an elongated retainer for preventing the withdrawal of said end portion from between said pair of walls, said retainer being disposed between said adjacent pair of said ribbon-like wires and including portions received in said channel for retaining said end portion of said screen disposed between said walls.

10. An insert adapted to be partially received within an elongated recess formed in a window screen frame member and to retain the end portion of a piece of screen composed in part of an adjacent pair of parallel ribbon-like wires in assembly with said frame member and comprising elongated portions adapted to respectively engage substantially opposed sides of said recess for retaining the insert partially within said recess, and means defining a channel extending longitudinally of said insert and disposed outside of said frame member recess when the insert is partially received within the recess, said insert being adapted to receive a retainer disposed partially between said adjacent pair of parallel ribbon-like wires for holding said screen and frame member in assembly.

11. A sheet metal insert adapted to be received within an elongated recess formed in a window screen frame member for the purpose of retaining the end portion of a piece of screen composed in part of an adjacent pair of parallel ribbon-like wires in assembly with said frame member, said sheet metal insert being comprised of means defining a plurality of webs, a pair of said webs being adapted to be received within said recess and to engage certain sides thereof for retaining said insert partially within said recess, a portion of said webs defining a wall adapted to oppose a second substantially parallel wall defined, at least in part, by an elongated portion of said frame member, said walls being adapted to receive said end portion of said screen therebetween, and other portions of said webs defining a channel opening substantially in the plane of one of said walls when said insert is disposed partially within said recess, said channel being adapted to receive a retainer disposed partially between said adjacent pair of ribbon-like wires for holding said end portion of said screen between said walls and in assembly with said frame member.

12. A sheet metal insert in accordance with claim 11 wherein said second substantially parallel wall is defined in entirety by said elongated portion of said frame member.

13. A sheet metal insert in accordance with claim 11 wherein the remaining part of said second substantially parallel wall, which is defined, at least in part, by said elongated portion of said frame member, is defined by still another portion of said webs.

14. A window screen and frame assembly including a piece of longitudinally resilient screen composed of a plurality of pairs of longitudinally extending warp wires and a plurality of parallel ribbon-like louver wires disposed with their major surfaces at a predetermined angle to the normal plane of the screen and held in position by integrating twists between said warp wires, end frame members for holding the end portions of said screen under tension, each of said end frame members being formed with an elongated recess opening toward the normal plane of said screen, and means for securing said end portions of said screen to said end frame members for holding said screen under longitudinal tension, said last-named means comprising retainer means having portions disposed between an adjacent pair of said parallel ribbon-like louver wires at the respective ends of said screen and an insert partially disposed within and in holding engagement with the sides of the recess formed in the respective end frame members, each of said inserts including means defining an elongated channel disposed outside of the recess in the respective end frame member and opening generally toward the normal plane of said screen for respectively receiving other portions of said retainer means for holding said screen and end frame members in assembly.

References Cited in the file of this patent

UNITED STATES PATENTS

| 2,270,423 | Ewing | Jan. 20, 1942 |
| 2,325,500 | Fosberg | July 27, 1943 |
| 2,630,170 | Ewing | Mar. 3, 1953 |